(12) United States Patent
Mahurin

(10) Patent No.: US 12,093,800 B2
(45) Date of Patent: Sep. 17, 2024

(54) HYBRID CONVOLUTION OPERATION

(71) Applicant: QUALCOMM Incorporated, San Diego, CA (US)

(72) Inventor: Eric Wayne Mahurin, Austin, TX (US)

(73) Assignee: QUALCOMM Incorporated, San Diego, CA (US)

( * ) Notice: Subject to any disclaimer, the term of this patent is extended or adjusted under 35 U.S.C. 154(b) by 900 days.

(21) Appl. No.: 17/165,648

(22) Filed: Feb. 2, 2021

(65) Prior Publication Data
US 2021/0241070 A1    Aug. 5, 2021

Related U.S. Application Data

(60) Provisional application No. 62/969,594, filed on Feb. 3, 2020.

(51) Int. Cl.
*G06N 3/04*    (2023.01)
*G06N 3/0464*    (2023.01)

(52) U.S. Cl.
CPC .............. *G06N 3/04* (2013.01); *G06N 3/0464* (2023.01)

(58) Field of Classification Search
CPC ................................. G06N 3/04; G06N 3/0464
See application file for complete search history.

(56) References Cited

U.S. PATENT DOCUMENTS

| | | | | |
|---|---|---|---|---|
| 11,429,851 | B1* | 8/2022 | Zhang | G06F 9/30101 |
| 2004/0268051 | A1* | 12/2004 | Berg | G06F 9/342 |
| | | | | 712/E9.047 |
| 2014/0101219 | A1 | 4/2014 | Tang et al. | |
| 2016/0343117 | A1 | 11/2016 | Schultz et al. | |
| 2018/0276534 | A1 | 9/2018 | Henry | |
| 2018/0322606 | A1 | 11/2018 | Das et al. | |
| 2019/0220742 | A1* | 7/2019 | Kuo | G06N 3/048 |
| 2020/0410036 | A1* | 12/2020 | Huynh | G06N 3/045 |
| 2021/0141571 | A1* | 5/2021 | Lew | G06F 3/0655 |
| 2021/0174180 | A1* | 6/2021 | Huang | G06N 3/04 |
| 2021/0241082 | A1* | 8/2021 | Nagy | G06F 12/0813 |

OTHER PUBLICATIONS

Chen, Xiaoming, et al. "Optimizing memory efficiency for convolution kernels on Kepler GPUs." Proceedings of the 54th Annual Design Automation Conference 2017. 2017. (Year: 2017).*

(Continued)

*Primary Examiner* — Hal Schnee
(74) *Attorney, Agent, or Firm* — Moore IP/Qualcomm

(57) ABSTRACT

A device includes one or more processors configured to retrieve a first block of data, the data corresponding to array of values arranged along at least a first dimension and a second dimension, to retrieve at least a portion of a second block of the data, and to perform a first hybrid convolution operation that applies a filter across the first block and at least the portion of the second block to generate output data. The output data includes a first accumulated block and at least a portion of a second accumulated block. The one or more processors are also configured to store the first accumulated block as first output data. The portion of the second block is adjacent to the first block along the first dimension and the portion of the second accumulated block is adjacent to the first accumulated block along the second dimension.

30 Claims, 7 Drawing Sheets

(56) References Cited

OTHER PUBLICATIONS

Divsalar D., et al., "Hybrid Concatenated Codes And Iterative Decoding", TDA Progress Report, xx, xx, Aug. 15, 1997 (Aug. 15, 1997), pp. 1-23. XP002944063, the whole document.
International Search Report and Written Opinion—PCT/US2021/016373—ISA/EPO—Apr. 8, 2021.

* cited by examiner

HYBRID CONVOLUTION OPERATION

I. CROSS-REFERENCE TO RELATED APPLICATIONS

The present application claims priority from U.S. Provisional Patent Application No. 62/969,594, filed Feb. 3, 2020, entitled "HYBRID CONVOLUTION OPERATION," which is incorporated herein by reference in its entirety.

II. FIELD

The present disclosure is generally related to computing devices and procedures for performing convolutions.

III. DESCRIPTION OF RELATED ART

Advances in technology have enabled significant amounts of data processing to be performed by portable electronic devices, such as smartphones. For example, conventional portable electronic devices often have sufficient processing resources to perform data processing such as filtering image data. Convolution is performed when a set of input data, such as a 2-dimensional array of image pixel values, is processed by "sliding" a filter across the input data to generate an output value for each input value. Using image data as an example, an output pixel value may be generated for each pixel of an input image based on the value of that pixel in the input image and also based on values of that pixel's neighbors in the input image.

However, because neighboring pixels values are used, multiple blocks of input image data are required to generate a single block of output image data. For example, generating a block of an output image can require accessing data from at least four, and up to nine, blocks of the input image due to overlap of the filter across blocks when processing pixels at a block edge. As a result, a relatively large number of memory accesses are performed, consuming processor resources and power, introducing complexity associated with computing addresses for the memory accesses, introducing alignment issues that may result in additional memory transfers, or a combination thereof.

In addition to image processing and similar applications, convolution is increasingly used in machine learning applications such as convolutional neural networks. In neural network applications, a convolutional layer input can have a large number of channels (e.g., thousands), restricting the benefit of conventional techniques that may be used to improve efficiency, such as maintaining a portion of input data in an intermediate state so that it can be reused over multiple iterations of a processing loop to reduce memory transfers in a single instruction, multiple data (SIMD)-type processing system. With the rapidly growing popularity of convolutional neural networks, reducing the amount of memory transfers and complexity associated with the memory transfers during a convolution can provide a significant improvement in device performance and user experience.

IV. SUMMARY

According to one implementation of the present disclosure, a device includes a memory and one or more processors. The memory is configured to store data corresponding to array of values arranged along at least a first dimension and a second dimension. The one or more processors are configured to retrieve a first block of the data and at least a portion of a second block of the data from the memory and to perform a first hybrid convolution operation that applies a filter across the first block and at least the portion of the second block to generate output data. The output data includes a first accumulated block and at least a portion of a second accumulated block. The one or more processors are also configured to store the first accumulated block as first output data. The portion of the second block is adjacent to the first block along the first dimension and the portion of the second accumulated block is adjacent to the first accumulated block along the second dimension.

According to another implementation of the present disclosure, a method of performing convolution includes retrieving, at one or more processors, a first block of data and at least a portion of a second block of data from a memory. The data corresponds to array of values arranged along at least a first dimension and a second dimension. The method includes performing a first hybrid convolution operation that applies a filter across the first block and at least the portion of the second block to generate output data. The output data includes a first accumulated block and at least a portion of a second accumulated block. The method also includes storing the first accumulated block as first output data. The portion of the second block is adjacent to the first block along the first dimension and the portion of the second accumulated block is adjacent to the first accumulated block along the second dimension.

According to another implementation of the present disclosure, a computer-readable storage device stores instructions that, when executed by one or more processors, cause the one or more processors to retrieve a first block of data and at least a portion of a second block of data from a memory, the data corresponding to an array of values arranged along at least a first dimension and a second dimension. The instructions also cause the one or more processors to perform a first hybrid convolution operation that applies a filter across the first block and at least the portion of the second block to generate output data. The output data includes a first accumulated block and at least a portion of a second accumulated block. The instructions also cause the one or more processors to store the first accumulated block as first output data. The portion of the second block is adjacent to the first block along the first dimension and the portion of the second accumulated block is adjacent to the first accumulated block along the second dimension.

According to another implementation of the present disclosure, an apparatus includes means for retrieving a first block of data and at least a portion of a second block of data, the data corresponding to an array of values arranged along at least a first dimension and a second dimension. The apparatus includes means for performing a hybrid convolution operation that applies a filter across the first block and at least the portion of the second block to generate output data. The output data includes a first accumulated block and at least a portion of a second accumulated block. The apparatus includes means for storing the first accumulated block as first output data. The portion of the second block is adjacent to the first block along the first dimension and the portion of the second accumulated block is adjacent to the first accumulated block along the second dimension.

Other aspects, advantages, and features of the present disclosure will become apparent after review of the entire application, including the following sections: Brief Description of the Drawings, Detailed Description, and the Claims.

V. BRIEF DESCRIPTION OF THE DRAWINGS

VI. DETAILED DESCRIPTION

Figure 1:
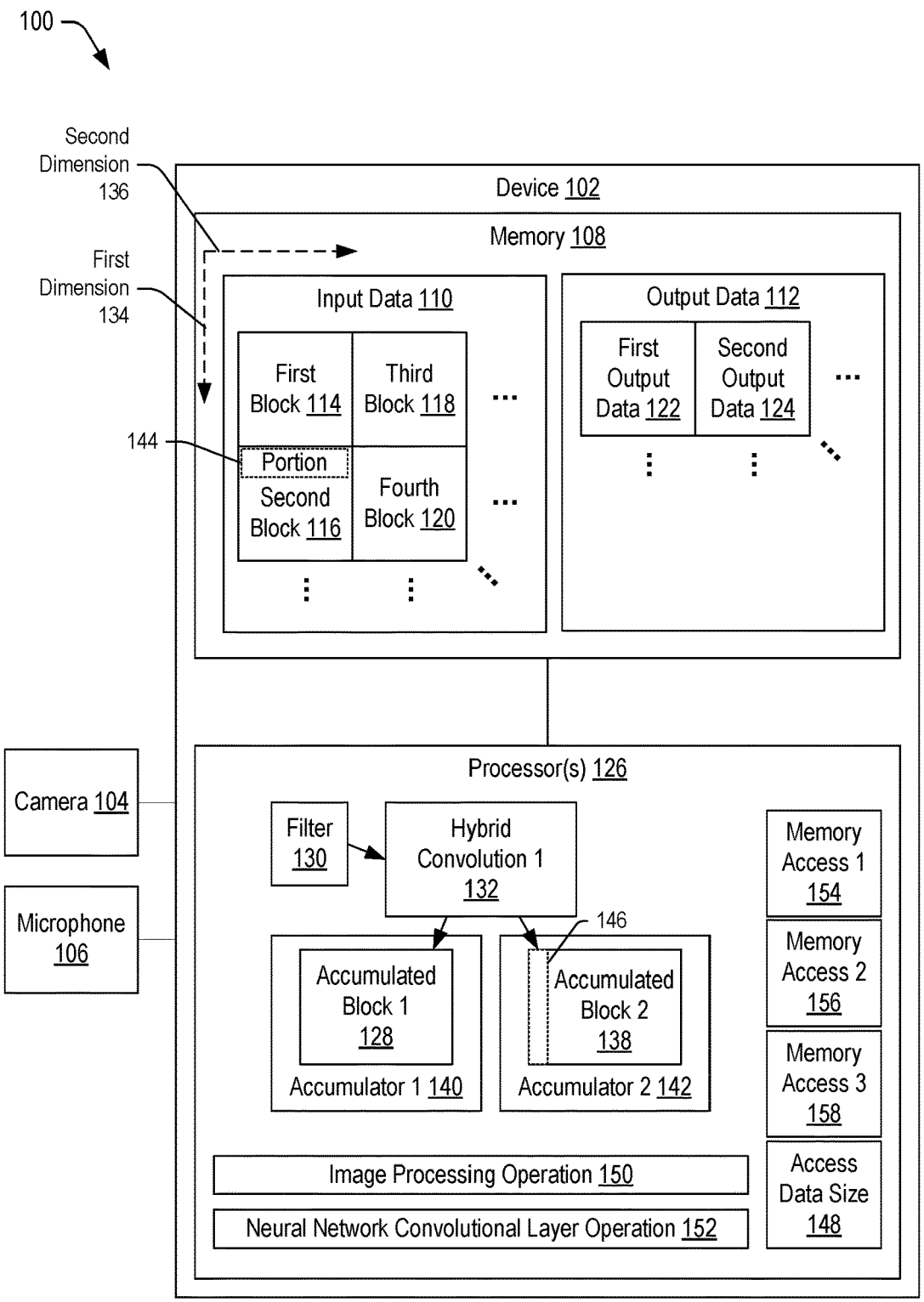
FIG. 1 is a diagram of a particular illustrative implementation of a system including a device operable to perform a hybrid convolution operation, in accordance with some examples of the present disclosure.

Conventional convolution operations can require a relatively large number of memory accesses and complexity, when processing data values at an edge of a block of input data retrieved from memory, to locate neighbors of the data values that are located in other blocks of the input data in the memory. The memory accesses and complexity can result in reduced performance of a device, can impair a user experience, such as due to reduced device performance when running such applications, and can increase power consumption, which may reduce useful battery life.

A hybrid convolution operation is presented that "slides" input data in one dimension (a "first" dimension) and output data in another dimension (a "second" dimension). As a result, in some implementations only two blocks of input memory aligned in the first dimension are required per block of output data. Explicit overlap reads of the input data in the first dimension may be performed without requiring overlap reads of the input data in the second dimension. Overall memory accesses and complexity are reduced as compared to conventional techniques, resulting in enhanced device performance.

Two accumulators (e.g., registers, dedicated memory, or other circuitry) that are each sized to hold a block of data can be used to hold partial accumulation values. The accumulators are aligned in the second dimension such that, when writing a row of data values (e.g., a sequence of data values extending along the second dimension) into the accumulators, when a row of one of the accumulators has been filled, subsequent data values are written into the corresponding row of the other accumulator. In some implementations, the accumulators are physically aligned (e.g., physically adjacent registers). In other implementations, the accumulators are not physically aligned but are logically aligned (e.g., physically non-adjacent registers that are accessed for data storage and retrieval as if the registers were physically adjacent). The partial accumulation values can be held until complete, avoiding additional memory accesses associated with storing partial accumulation values. In some implementations, a ping-pong technique is used to alternate use of the accumulators from iteration to iteration of the hybrid convolution operation.

The hybrid convolution operation can be applied to two-dimensional convolutional layers, can be applied to conventional convolution with two or more dimensions (including neural network channel-wise), and can be applied to other filtering operations such as max/average (pooling), absolute difference, image correlation, as non-limiting examples. Hybrid convolution techniques as described herein can be applied to scalar processing, single instruction multiple data (SIMD) vector processing, and SIMD array processing, as illustrative examples.

As used herein, "coupled" may include "communicatively coupled," "electrically coupled," or "physically coupled," and may also (or alternatively) include any combinations thereof. Two devices (or components) may be coupled (e.g., communicatively coupled, electrically coupled, or physically coupled) directly or indirectly via one or more other devices, components, wires, buses, networks (e.g., a wired network, a wireless network, or a combination thereof), etc. Two devices (or components) that are electrically coupled may be included in the same device or in different devices and may be connected via electronics, one or more connectors, or inductive coupling, as illustrative, non-limiting examples. In some implementations, two devices (or components) that are communicatively coupled, such as in electrical communication, may send and receive signals (e.g., digital signals or analog signals) directly or indirectly, via one or more wires, buses, networks, etc. As used herein, "directly coupled" may include two devices that are coupled (e.g., communicatively coupled, electrically coupled, or physically coupled) without intervening components.

It may be further understood that the terms "comprise," "comprises," and "comprising" may be used interchangeably with "include," "includes," or "including." Additionally, it will be understood that the term "wherein" may be used interchangeably with "where." As used herein, "exemplary" may indicate an example, an implementation, and/or an aspect, and should not be construed as limiting or as indicating a preference or a preferred implementation. As used herein, an ordinal term (e.g., "first," "second," "third," etc.) used to modify an element, such as a structure, a component, an operation, etc., does not by itself indicate any priority or order of the element with respect to another element, but rather merely distinguishes the element from another element having a same name (but for use of the ordinal term). As used herein, the term "set" refers to one or more of a particular element, and the term "plurality" refers to multiple (e.g., two or more) of a particular element.

The term "configuration" may be used in reference to a method, apparatus, device, system, or any combination thereof, as indicated by its particular context. Where the term "comprising" is used in the present description and claims, it does not exclude other elements or operations. The term "based on" (as in "A is based on B") is used to indicate any of its ordinary meanings, including the cases (i) "based on at least" (e.g., "A is based on at least B") and, if appropriate in the particular context, (ii) "equal to" (e.g., "A is equal to B"). In the case (i) where "A is based on B" includes "based on at least", this may include the configuration where A is coupled to B. Similarly, the term "in response to" is used to indicate any of its ordinary meanings, including "in response to at least." The term "at least one" is used to indicate any of its ordinary meanings, including "one or more." The term "at least two" is used to indicate any of its ordinary meanings, including "two or more."

In the present disclosure, terms such as "generating," "calculating," "estimating," "using," "selecting," "accessing," and "determining" may be used interchangeably. For example, "generating," "calculating," "estimating," or "determining" a parameter (or a signal) may refer to actively generating, estimating, calculating, or determining the parameter (or the signal) or may refer to using, selecting, or accessing the parameter (or signal) that is already generated, such as by another component or device.

FIG. 1 depicts system 100 that includes a device 102 that is configured to perform a first hybrid convolution operation 132 that processes input data 110 using a filter 130. In a particular implementation, the filter 130 is a representative filter of multiple filters that are supported by the one or more processors 190, such as an array of programmable weights operable as a convolution kernel. The device 102 includes a memory 108 (e.g., dynamic random-access memory (DRAM)) coupled to one or more processors 126. The one or more processors 126 are configured to convolve the input data 110 with the filter 130 in accordance with an image processing operation 150 (e.g., a feature detection operation) or in accordance with a neural network convolutional layer operation 152 (e.g., to process input data using a convolutional neural network), as illustrative, non-limiting examples.

The memory 108 stores the input data 110. In some implementations, the input data 110 corresponds to image data, such as image data that is captured by a camera 104 that is coupled to, or integrated in, the device 102. In some implementations, the input data 110 corresponds to audio data, such as audio data that is captured by a microphone 106 that is that is coupled to, or integrated in, the device 102. In some implementations, the input data 110 corresponds to one or more layers of data to be operated upon by a convolutional neural network.

The input data 110 corresponds to an array of values that are logically arranged in rows and columns, with each column extending along a first dimension 134 and each row extending along a second dimension 136. Although the input data 110 is described herein in terms of rows and columns, the input data 110 need not be actually stored in physical rows and columns of the memory 108 in a manner that duplicates the logical arrangement of the array (e.g., where adjacent array values are stored in adjacent physical memory locations). To illustrate, the memory 108 may be configured to provide, to the one or more processors 126, access to the input data 110 according to a memory access data size 148 supported by the memory 108 for memory accesses by the one or more processors 126. In some implementations, the memory access data size 148 is a configuration value stored in a register that can be adjusted. In other implementations, the memory access data size 148 is a non-configurable, inherent value based on the layout or design of the one or more processors 126, of the memory 108, or a combination thereof. In some implementations, each access to the input data 110 retrieves values that are read from sequential memory locations in the memory 108, such as a cache line of values, but may represent values corresponding to a two-dimensional segment of the array.

As described further herein, the input data 110 may be arranged in physical memory locations so that each memory access to retrieve a portion of the input data 110 retrieves a respective M×M segment of the array of values (M is a positive integer). To illustrate, in an implementation in which M is 4 and the input data 110 represents a two-dimensional array of pixel values corresponding to an image, each access to read the input data 110 from the memory 108 may correspond to a 4×4 block of pixel values (e.g., 16 pixel values from 4 adjacent rows and 4 adjacent columns of the array of pixel values), that are arranged as 16 pixel values in sequential physical locations in the memory 108 to be retrievable as a single cache line from the memory 108.

The one or more processors 126 are configured to retrieve a first block 114 of the input data 110 and at least a portion 144 of a second block 116 of the input data 110 from the memory 108 and to perform a first hybrid convolution operation 132 that applies a filter 130 across the first block 114 and at least the portion 144 of the second block 116 to generate output data. The output data includes a first accumulated block 128 of data that is output to a first accumulator 140 and at least a portion 146 of a second accumulated block 138 of data that is output to a second accumulator 142. In some implementations, each of the first accumulator 140 and the second accumulator 142 corresponds to registers or other data storage circuitry that is configured to store a value that is updated as additional values are accumulated with (e.g., added to) the stored value. In some implementations, each of the first accumulator 140 and the second accumulator 142 further includes circuitry (e.g., an adder) configured to receive input values and to accumulate the input values with stored values. The one or more processors 126 are configured to transfer and store the first accumulated block 128 from the first accumulator 140 to the memory 108 as first output data 122.

Figure 2:
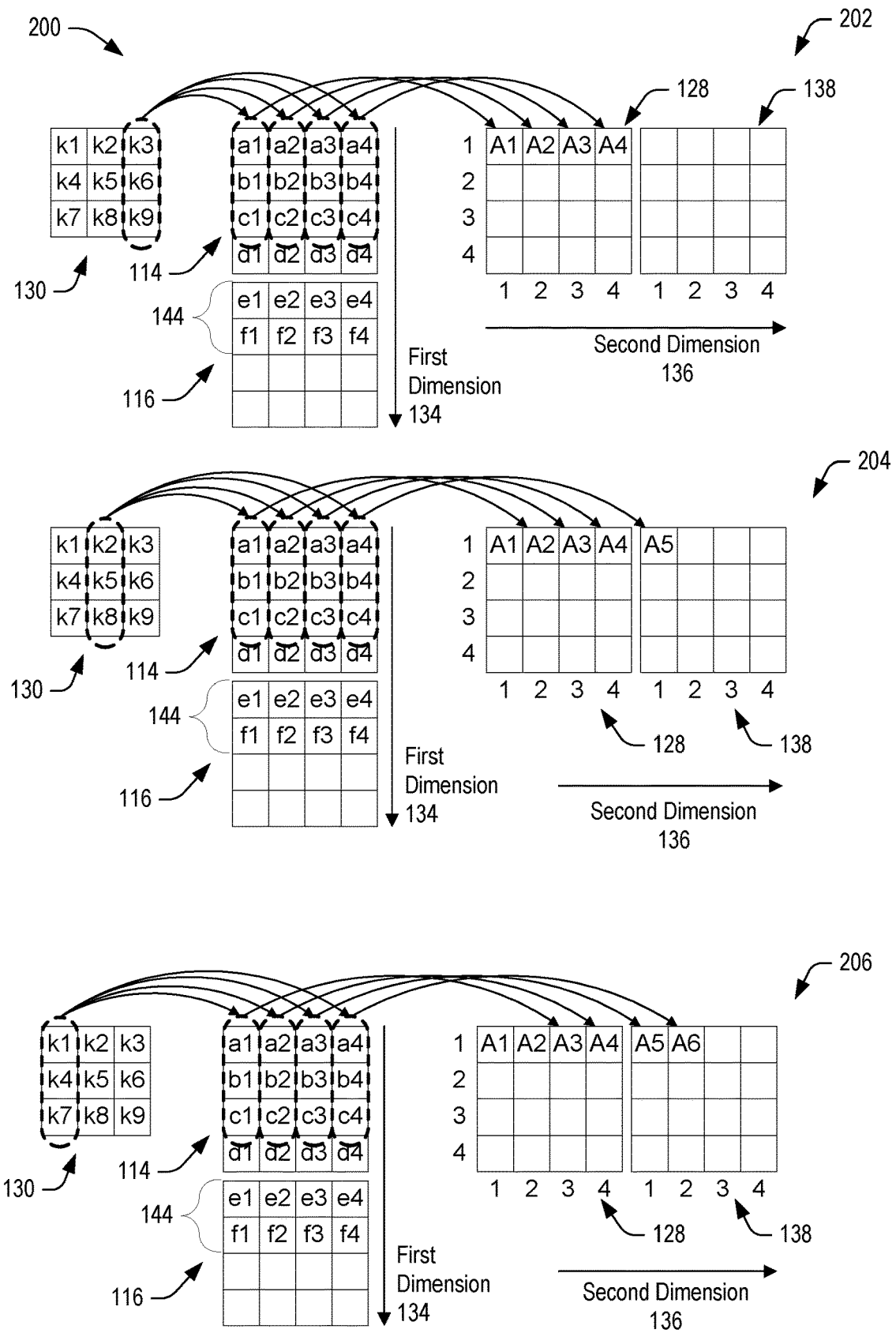
FIG. 2 is a diagram illustrating operations that are performed by the device of FIG. 1 as part of the hybrid convolution operation, in accordance with some examples of the present disclosure.
Figure 3:
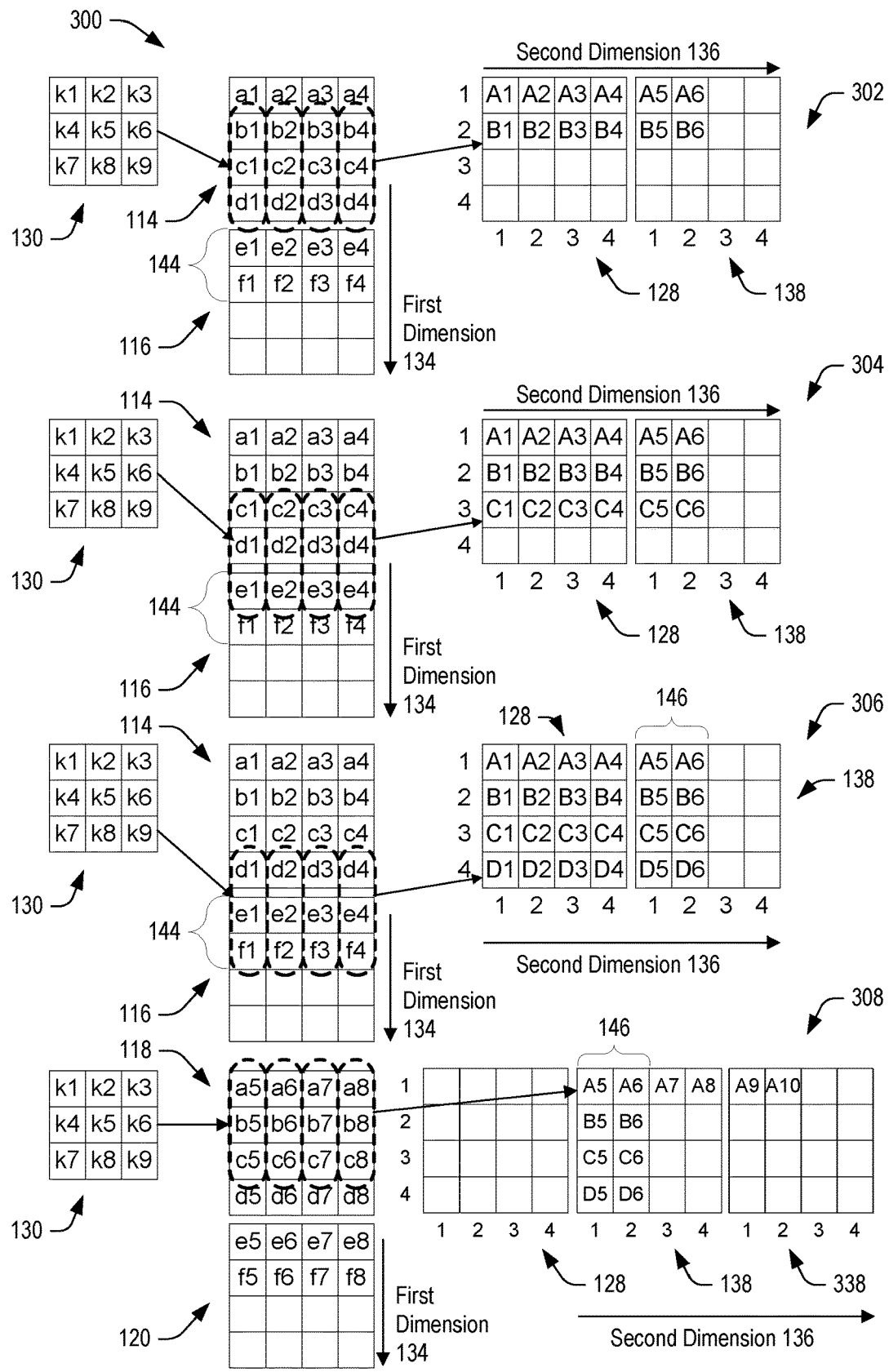
FIG. 3 is diagram illustrating operations that are performed by the device of FIG. 1 in conjunction with the hybrid convolution operation, in accordance with some examples of the present disclosure.

As described further with reference to FIGS. 2-3, the portion 144 of the second block 116 is adjacent to the first block 114 along the first dimension 134 and the portion 146 of the second accumulated block 138 is adjacent to the first accumulated block 128 along the second dimension 136. In some implementations, each of the first block 114, the second block 116, the first accumulated block 128, and the second accumulated block 138 is sized in accordance with the memory access data size 148.

In some implementations, the first hybrid convolution operation 132 uses zero padding (or performs operations that are mathematically equivalent to using zero padding) along the second dimension 136 without using zero padding along the first dimension 134, as illustrated further with reference to FIGS. 2-3. This use of zero padding along one dimension and not along the other dimension enables the first hybrid convolution operation 132 to perform convolution using at most two memory accesses to retrieve the first block 114 and the portion 144 of the second block 116, and using at most two memory accesses to store the first accumulated block 128 (e.g., as the first output data 122) and the portion 146 of the second accumulated block 138 (e.g., as second output data 124). As compared to conventional convolution operations in which data from portions of four input blocks is accessed to generate one output block, or in which one input block is accessed to generate output data corresponding to portions of four output blocks, the first hybrid convolution operation 132 uses fewer overall memory accesses to retrieve input data and to store output data.

The one or more processors 126 may be further configured to perform a sequence of hybrid convolution operations, including the first hybrid convolution operation 132 and a second hybrid convolution operation, in a pipelined manner in which storage of the first accumulated block and performance of the second hybrid convolution operation occur during a same pipeline cycle, as described in further detail with reference to FIG. 4. In an example, the second hybrid convolution operation sequentially follows the first hybrid convolution operation 132 and operates on a third block 118 and a portion of a fourth block 120 of input data, using the portion 146 of the second accumulated block 138 as "seed" values to generate second output data 124. Pipelined performance of a sequence of hybrid convolution operations reduces overall latency by enabling memory accesses and computations to be performed in parallel, and sequential performance of hybrid convolution operations enables reduced complexity with regard to tracking and aligning partial convolution data (e.g., the portion 146 of the second accumulated block 138) as compared to some conventional techniques.

FIG. 2 depicts a first set of diagrams 200 that graphically illustrate operations that are performed in accordance with a particular implementation of the first hybrid convolution operation 132. A first diagram 202 illustrates an example of the filter 130 as a 3×3 array, the first block 114 as a 4×4 array, the second block 116 as a 4×4 array, the first accumulated block 128 as a 4×4 array, and the second accumulated block 138 as a 4×4 array. Each of the filter 130, the first block 114, the second block 116, the first accumulated block 128, and the second accumulated block 138 corresponds to a data structure, e.g., a logical arrangement of values.

The sizes and arrangements of the data structures are depicted for ease of explanation, and in other implementations one or more of the filter 130, the first block 114, the second block 116, the first accumulated block 128, and the second accumulated block 138 has a different size or arrangement. The size (e.g., number of elements) of each of the the first block 114, the second block 116, the first accumulated block 128, and the second accumulated block 138 matches the memory access data size 148 (e.g., 16 elements) so that the first block 114 is retrievable from the memory 108 via a first memory access operation (e.g., a single cache line read or load operation), the second block 116 is retrievable from the memory 108 via a second memory access operation (e.g., another single cache line read or load operation), the first accumulated block 128 can be stored to the memory 108 via a third memory access operation (e.g., a single cache line write or store operation), and the second accumulated block 138 can be stored to the memory 108 via a fourth memory access operation (e.g., another single cache line write or store operation).

The filter 130 includes 9 values, labelled k1, k2, . . . k9, arranged in 3 rows and 3 columns. The first block 114 includes 16 values, including a first row with values a1, a2, a3, and a4, a second row with values b1, b2, b3, and b4, a third row with values c1, c2, c3, and c4, and a fourth row with values d1, d2, d3, and d4. The portion 144 of the second block 116 includes 8 values, arranged as a first row with values e1, e2, e3, and e4 and a second row with values f1, f2, f3, and f4. The fourth row of the first block 114 is adjacent to the first row of the second block 116 along the first dimension 134. The first block 114 and the portion 144 of the second block 116 together correspond to N rows and a first M columns of the array of the input data 110, where N and M are positive integers and N is greater than M. The filter 130 includes P rows and P columns of filter values, where P=N−M+1. In the example of FIG. 2, M=4, N=6, and P=3.

The one or more processors 126 are configured to access the first block 114 using the first memory access operation 154 and to access the portion 144 of the second block 116 using the second memory access operation 156. Each of the first memory access operation 154 and the second memory access operation 156 is configured to retrieve, at most, M rows and M columns of the input data 110. The third row and the fourth row of the second block 116 are not operated upon during the first hybrid convolution operation 132 and are therefore illustrated without values. In some implementations, the entire second block 116 is retrieved from the memory 108 during the second memory access operation 156, although the values of the third and fourth rows are not operated upon during the first hybrid convolution operation 132. In other implementations, the second memory access operation 156 omits retrieving the third and fourth rows of the second block 116 from the memory 108.

In the first diagram 202, the third column (e.g., the right-most column) of the filter 130 is illustrated as multiplied with the first three rows (e.g., rows a, b, and c) of the first block 114. An accumulation value A1 is generated in the first row, first column of the first accumulated block 128 as: A1+=(k3*a1)+(k6*b1)+(k9*c1), where "*" represents a multiplication operation and "+=" represents a compound addition assignment operator, as described further below. An accumulation value A2 is generated in the first row, second column of the first accumulated block 128 as: A2+=(k3*a2)+(k6*b2)+(k9*c2). An accumulation value A3 is generated in the first row, third column of the first accumulated block 128 as: A3+=(k3*a3)+(k6*b3)+(k9*c3), and an accumulation value A4 is generated in the first row, fourth column of the first accumulated block 128 as: A4+=(k3*a4)+(k6*b4)+(k9*c4).

A second diagram 204 illustrates the second column (e.g., the middle column) of the filter 130 multiplied with the first three rows of the first block 114. An updated accumulation value A2 is generated in the first row, second column of the first accumulated block 128 by adding the previous value of A2 (as described with reference to the first diagram 202) with the value: (k2*a1)+(k5*b1)+(k8*c1). An updated accumulation value A3 is generated in the first row, third column of the first accumulated block 128 by adding the previous value of A3 with the value: (k2*a2)+(k5*b2)+(k8*c2). An updated accumulation value A4 is generated in the first row, fourth column of the first accumulated block 128 by adding the previous value of A4 with the value: (k2*a3)+(k5*b3)+(k8*c3). An accumulation value A5 is generated in the first row, first column of the second accumulated block 138 as: A5=(k2*a4)+(k5*b4)+(k8*c4).

A third diagram 206 illustrates the first column (e.g., the left-most column) of the filter 130 multiplied with the first three rows of the first block 114. An updated accumulation value A3 is generated in the first row, third column of the first accumulated block 128 by adding the previous value of A3 with the value: (k1*a1)+(k4*b1)+(k7*c1). An updated accumulation value A4 is generated in the first row, fourth column of the first accumulated block 128 by adding the previous value of A4 with the value: (k1*a2)+(k4*b2)+(k7*c2). An updated accumulation value A5 is generated in the first row, first column of the second accumulated block 138 by adding the previous value of A5 with the value: (k1*a3)+(k4*b3)+(k7*c3). An accumulation value A6 is generated in the first row, second column of the second accumulated block 138 as: A6=(k1*a4)+(k4*b4)+(k7*c4).

Continuing to FIG. 3, a fourth diagram 302, a fifth diagram 304, and a sixth diagram 306 depicts additional operations that are performed in accordance with the particular implementation of the first hybrid convolution operation 132 of FIG. 2. The fourth diagram 302 illustrates multiplication of the filter 130 with the second, third, and fourth rows (rows b, c, and d) of the first block 114 to generate accumulation values B1, B2, B3, and B4 in the first accumulated block 128 and accumulation values B5 and B6 in the second accumulated block 138 in a manner analogous to the manner described in FIG. 2.

The fifth diagram 304 illustrates multiplication of the filter 130 with the third and fourth rows (rows c and d) of the first block 114 and the first row (row e) of the second block 116 to generate accumulation values C1, C2, C3, and C4 in the first accumulated block 128 and accumulation values C5 and C6 in the second accumulated block 138. The sixth diagram 306 illustrates multiplication of the filter 130 with the fourth rows (row d) of the first block 114 and the first two rows (rows e and f) of the second block 116 to generate accumulation values D1, D2, D3, and D4 in the first accumulated block 128 and accumulation values D5 and D6 in the second accumulated block 138.

At the completion of the first hybrid convolution operation 132, the first accumulated block 128 and the second accumulated block 138 have a configuration as depicted in the sixth diagram 306, with the first accumulated block 128 having accumulation values representing convolution of the filter 130 with the first block 114 and the portion 144 of the second block 116. The second block 116 includes partial accumulation values in the portion 146 that may be used as "seed" values for a next hybrid convolution operation. The first accumulated block 128 and the second accumulated block 138 together correspond to M rows and N columns of output data. In a particular implementation, the first accumulated block 128 corresponds to M rows and M columns of accumulated values in the first accumulator 140, and the portion 146 of the second accumulated block 138 corresponds to M rows and N-M columns of partial accumulated values in the second accumulator 142.

A seventh diagram 308 illustrates a portion of a second hybrid convolution operation that follows the first hybrid convolution operation 132. The one or more processors 126 perform the second hybrid convolution operation on the third block 118 and the portion of the fourth block 120 to update the second accumulated block 138 and to generate at least a portion of a third accumulated block 338 that is adjacent to the second accumulated block 138 along the second dimension 136. The third block 118 and at least a portion of the fourth block 120 together correspond to the N rows and a second M columns (e.g., columns 5, 6, 7, and 8) of the array have been retrieved from the memory 108, and the first accumulated block 128 has been stored to the memory 108 as the first output data 122 via the third memory access operation 158. The partial accumulation values in the portion 146 of the second accumulated block 138 are used as seed values, and the filter 130 is applied to the values of the third block 118 and the fourth block 120 in a similar manner as described with respect to the diagrams 202-206 and 302-206. For example, the seventh diagram 308 depicts accumulation results after applying the filter 130 to the first three rows of the third block 118 to generate accumulation values A5, A6, A7, and A8 in the second accumulated block 138 and accumulation values A9 and A10 in the third accumulated block 338. In some implementations the third accumulated block 338 is generated in a third accumulator, and in other implementations the first accumulator 140 and the second accumulator 142 are accessed according to a ping-pong technique in which the third accumulated block 338 is generated in the first accumulator 140 after the first accumulated block 128 has been transferred to the memory 108.

The second hybrid convolution operation continues in as similar manner as the first hybrid convolution operation 132 and populates the second accumulated block 138 and a portion of the third accumulated block 338 based on the third block 118 and the fourth block 120 of the input data 110. After completion of the second hybrid convolution operation, the one or more processors 126 may store the second accumulated block 138 as the second output data 124 and retrieve additional blocks of the input data 110 for processing during a third hybrid convolution operation, such as described further with reference to FIG. 4.

The graphical depiction of the implementation the first hybrid convolution operation 132 in diagrams 202-206 of FIG. 2 and diagrams 302-306 of FIG. 3 as a sliding convolution in which the filter 130 is applied to more than one block of the input data 110 in the first dimension 134 (e.g., a 6×4 group of values from two 4×4 blocks) to generate accumulated data that spans more than one accumulated block in the second dimension 136 (e.g., a 4×6 group of accumulation values in two 4×4 accumulation blocks) is provided for clarity of understanding and should not be considered limiting. Although the first hybrid convolution operation 132 is depicted in FIGS. 2-3 as "sliding" the filter 130 left-to-right in the second dimension 136 and top-to-bottom in the first dimension 134, in other implementations, the first hybrid convolution operation 132 can include sliding the filter 130 right-to-left in the second dimension 136, bottom-to-top in the first dimension 134, or both. Although zero padding is not depicted, the multiplications described in FIGS. 2-3 may be mathematically equivalent to a convolution in which one or more columns of zero padding are added to the left, to the right, or to both the left and right (but not to the top or the bottom), of the first block 114 and the second block 116. Alignment of blocks of the input data 110 and blocks of the accumulated data, as well as formatting of such blocks for efficiency of storage, retrieval, and arithmetic processing, may deviate from the examples depicted in FIGS. 2-3 and may vary according to particular implementations.

Figure 4:
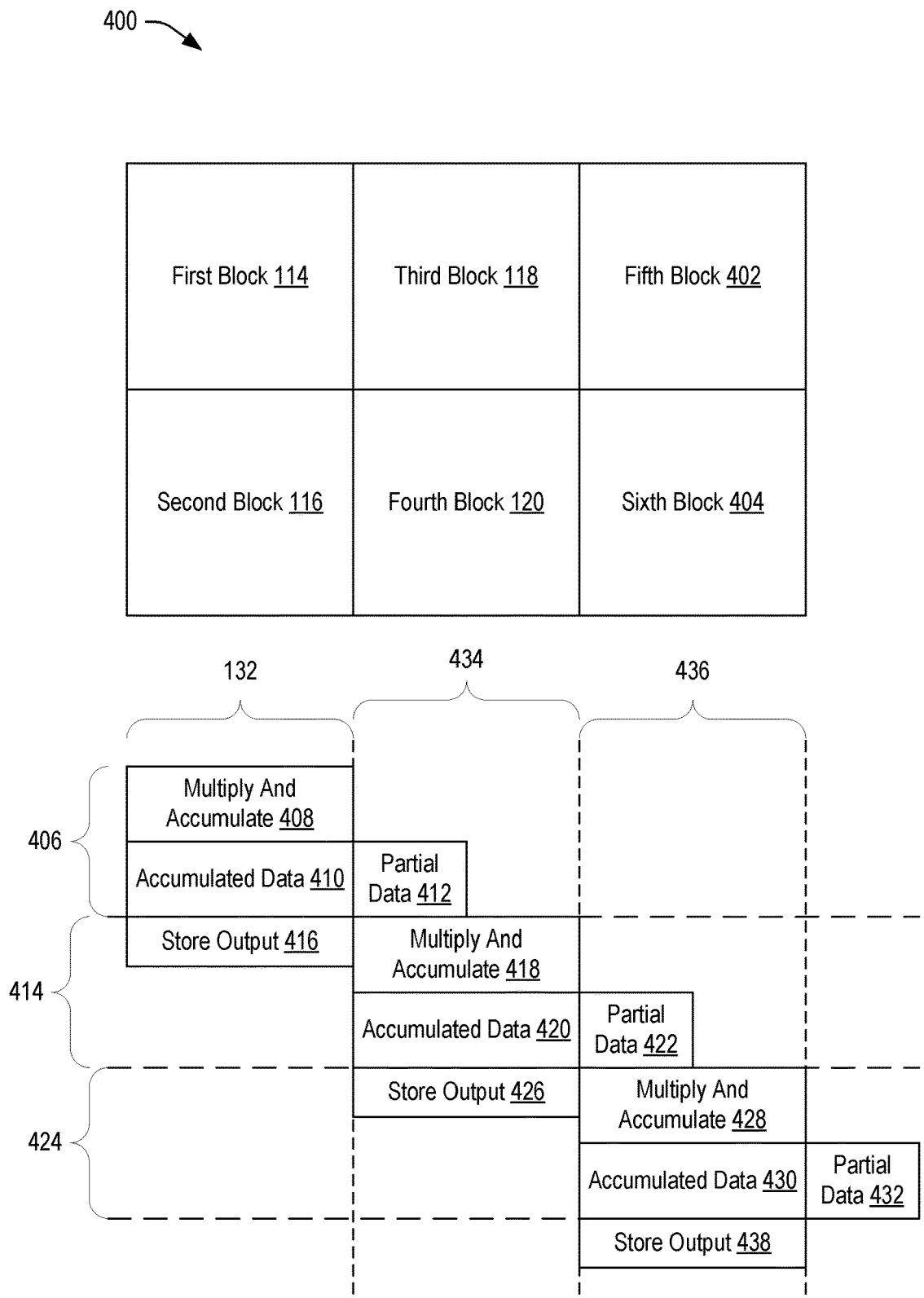
FIG. 4 is a diagram illustrating pipelined performance of a sequence of hybrid convolution operations that are performed by the device of FIG. 1, in accordance with some examples of the present disclosure.

FIG. 4 depicts an implementation in which the one or more processors 126 are configured to perform a sequence of hybrid convolution operations during a first pipeline cycle 406, a second pipeline cycle 414 that follows the first pipeline cycle 406, and a third pipeline cycle 424 that follows the second pipeline cycle 414. The sequence of hybrid convolution operations includes the first hybrid convolution operation 132, a second hybrid convolution operation 434, and a third hybrid convolution operation 436 performed in a pipelined manner in which storage of the first accumulated block 128 and performance of the second hybrid convolution operation 434 occur during a same pipeline cycle, as explained further below. A portion of the array of the input data 110 is graphically depicted as including the first block 114, the second block 116, the third block 118, the fourth block 120, a fifth block 402 adjacent to the third block 118, and a sixth block 404 that is adjacent to the fifth block 402 and to the fourth block 120. Although six blocks of the input data 110 are illustrated for purposes of example, in other implementations the input data 110 any include any number (e.g., thousands) of blocks.

During the first pipeline cycle 406, data of the first block 114 and at least the portion 144 of the second block 116 are processed via a first multiply and accumulate operation 408 that generates accumulated data 410 and partial data 412, such as the multiplication and accumulations described with reference to FIGS. 2-3. The first block 114 and the portion 144 of the second block 116 are retrieved by the first memory access operation 154 and the second memory access operation 156, respectively, which are performed during the first pipeline cycle 406 in some implementations or prior to the first pipeline cycle 406 in other implementations. In an illustrative example, the accumulated data 410 corresponds to the first accumulated block 128, and the partial data 412 corresponds to the portion 146 of the second accumulated block 138 that remains as seed values for the second hybrid convolution operation 434 (e.g., as described with reference to the seventh diagram 308 of FIG. 3).

During the second pipeline cycle 414, data of the third block 118 and at least a portion of the fourth block 120 are processed via a second multiply and accumulate operation 418 to generate accumulated data 420 and partial data 422. The third block 118 and the fourth block 120 are retrieved via two memory access operations in a similar manner as the first block 114 and the second block 116. In parallel with the multiply and accumulate operation 418 (i.e., during the second pipeline cycle 414), the accumulated data 410 is stored to the memory 108 as the first accumulated block 128 via an output data storage operation 416 (e.g., the third memory access operation 158).

During the third pipeline cycle 424, data of the fifth block 402 and at least a portion of the sixth block 404 are processed via a third multiply and accumulate operation 428 to generate accumulated data 430 and partial data 432. In parallel with the multiply and accumulate operation 428, the accumulated data 420 is stored to the memory 108 as the second accumulated block 138 via an output data storage operation 426. The accumulated data 430 is stored via an output data storage operation 438 after the third pipeline cycle 424 (e.g., during a fourth pipeline cycle).

Although only three pipeline cycles are depicted, the sequence of hybrid convolution operations may continue until all block rows and block columns of the input data 110 have been processed. As used herein, a "block row" is a set of adjacent rows that matches a number of rows in a block of the input data 110, and a "block column" is a set of adjacent columns that matches a number of columns in a block of the input data 110. As illustrated, a first block row of the input data 110 includes the first block 114, the third block 118, and the 402; a second block row of the input data 110 includes the second block 116, the fourth block 120, and the sixth block 404; a first block column of the input data 110 includes the first block 114 and the second block 116, and a second block column of the input data 110 includes the third block 118 and the 120. In an implementation in which each block of the input data 110 is sized as a 4×4 block (e.g., 4 rows and 4 columns), each block row spans 4 rows of the input data 110 and each block column spans 4 columns of the input data 110.

Processing of the input data 110 can be performed according to the psuedocode illustrated in Table 1.

Figure 5:
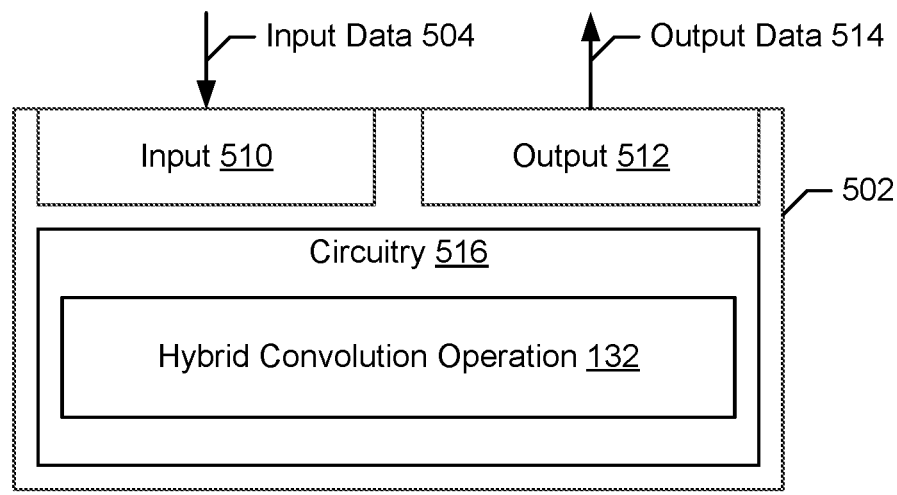
FIG. 5 is a diagram of another implementation of a device operable to hybrid convolution operations, in accordance with some examples of the present disclosure.

FIG. 5 depicts an implementation of a device 502 that includes circuitry 516 configured to perform hybrid convolution operations, such as the first hybrid convolution operation 132. The circuitry 516 is integrated in a discrete component, such as an integrated circuit (e.g., an application specific integrated circuit (ASIC)). In some implementations, the device 502 corresponds to a semiconductor chip or package as described further with reference to FIG. 7. In some implementations, the circuitry 516 includes the one or more processors 126 configured to execute stored instructions to perform operations described with respect to the first hybrid convolution operation 132, dedicated circuitry (e.g., hardware) to perform operations described with respect to the first hybrid convolution operation 132, or any combination thereof.

The device 502 includes an input 510, such as a first bus interface, to enable the input data 110 (or one or more blocks of the input data 110) to be received as input data 504 from one or more storage devices external to the device 502. The device 502 also includes an output 512, such as a second bus interface, to enable sending of output data 514 computed during hybrid convolution operations, such as the output data 112 (or one or more blocks of the output data 112). The device 502 enables implementation of convolution processing as a component in a system, such as a dedicated neural network processing unit (e.g., including one or more graphical processing units (GPUs), digital signal processors (DSPs), or any combination thereof), for cloud-based server systems to accelerate inference or other machine learning applications.

Figure 6:
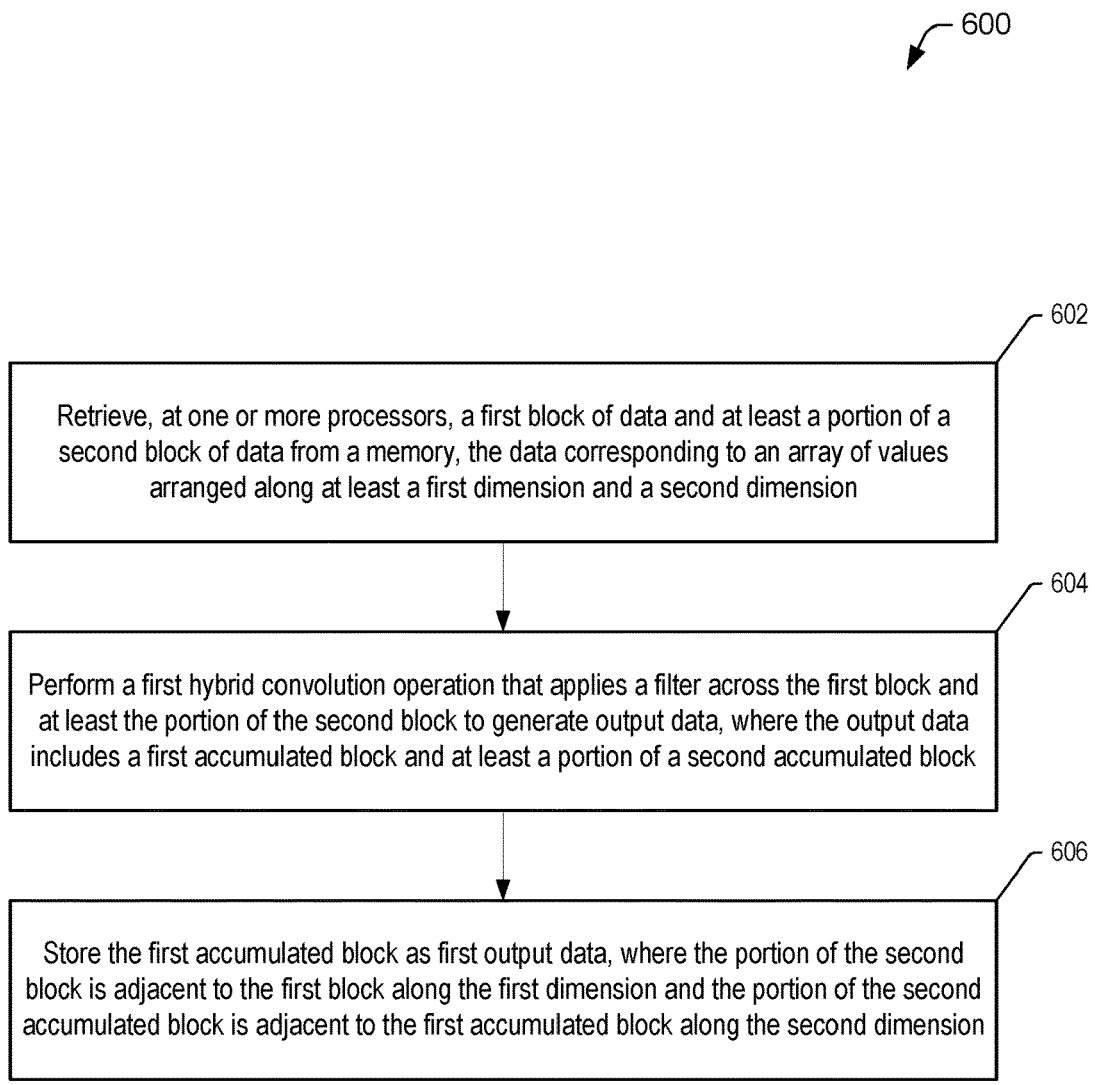
FIG. 6 is a flow chart of an implementation of a method of performing convolution that may be performed by the device of FIG. 1, in accordance with some examples of the present disclosure.

Referring to FIG. 6, a particular implementation of a method 600 of performing convolution is depicted. In some implementations, the method 600 is performed by the device 102 or the device 502, as illustrative, non-limiting examples.

The method 600 includes, at 602, retrieving, at one or more processors, a first block of data and at least a portion of a second block of data from a memory. The data corresponds to an array of values arranged along at least a first dimension and a second dimension. For example, the one or more processors 126 retrieve the first block 114 of the input data 110 and at least the portion 144 of the second block 116 of the input data 110.

The method 600 includes, at 604, performing a first hybrid convolution operation that applies a filter across the first block and at least the portion of the second block to generate output data. The output data includes a first accumulated block and at least a portion of a second accumulated

TABLE 1

```
set Primary Accumulator = first accumulator 140
set Secondary Accumulator = second accumulator 142
for i = 1 to NumBlockRows of the input data 110 {
   for j = 1 to NumBlockColumns of the input data 110 {
      set blockA = block i,j of the data
      if (i==NumBlockRows) set blockB to all zeros, else set blockB = block i+1,j of
         the data
      perform hybrid convolution operation on blockA and a portion of blockB to
         generate an accumulated block in the Primary Accumulator and partial
         accumulation data in the Secondary Accumulator
      store the accumulated block in the Primary Accumulator as output block i,j of
         the output data 112
      switch the Primary Accumulator and the Secondary Accumulator
      next j
   }
   next i
}
``` block. For example, the one or more processors 126 perform the first hybrid convolution operation 132 that applies the filter 130 across the first block 114 and the portion 144 of the second block 116 to generate the first accumulated block 128 and the portion 146 of the second accumulated block 138. As an illustrative example, the one or more processors 126 are configured to convolve the input data 110 with the filter 130 in accordance with at least one of the image processing operation 150 or the neural network convolutional layer operation 152.

The method 600 includes, at 606, storing the first accumulated block as first output data. The portion of the second block is adjacent to the first block along the first dimension and the portion of the second accumulated block is adjacent to the first accumulated block along the second dimension. For example, the one or more processors 126 store the first accumulated block 128 to the memory 108 as the first output data 122. The portion 144 of the second block 116 is adjacent to the first block 114 along the first dimension 134, and the portion 144 of the second accumulated block 138 is adjacent to the first accumulated block 128 along the second dimension 136.

In some implementations, the first hybrid convolution operation uses zero padding along the second dimension 136 without using zero padding along the first dimension 134 to enable convolution using at most two memory accesses to retrieve the first block 114 and the portion 144 of the second block 116 and using at most two memory accesses to store the first accumulated block 128 and the portion 146 of the second accumulated block 138.

In some implementations, each of the first block, the second block, the first accumulated block, and the second accumulated block is sized in accordance with a memory access data size that is supported by the memory for memory accesses by the one or more processors, such as the memory access data size 148. In some implementations, retrieving the first block includes using the first memory access operation 154; retrieving the portion 144 of the second block 116 includes using the second memory access operation 156; each of the first memory access operation 154 and the second memory access operation 156 is configured to retrieve, at most, M rows and M columns of the input data 110 (where M is a positive integer); and each of the first accumulated block 128 and the second accumulated block 138 corresponds to M rows and M columns of output data 112.

In some implementations, the method 600 also includes: retrieving the third block 118 of the input data 110 that is adjacent to the first block 114 along the first dimension 134 of the array; retrieving at least a portion of the fourth block 120 of the input data 110 that is adjacent to the portion 144 of the second block 116 along the first dimension 134 of the array; performing a second hybrid convolution operation (e.g., the second hybrid convolution operation 434) on the third block 118 and the portion of the fourth block 120 to update the second accumulated block 138 and to generate at least a portion of a third accumulated block (e.g., the partial data 422) that is adjacent to the second accumulated block along the second dimension 136; and storing the second accumulated block as the second output data 124.

As an illustrative example, such as depicted in FIG. 4, the first hybrid convolution operation 132 and the second hybrid convolution operation 434 are part of a sequence of hybrid convolution operations that are performed in a pipelined manner in which storage of the first accumulated block 128 and performance of the second hybrid convolution operation 434 occur during a same pipeline cycle (e.g., the second pipeline cycle 414). In some implementations, the method 600 includes generating the first accumulated block 128 in the first accumulator 140; generating the second accumulated block 138 in the second accumulator 142; and generating the third accumulated block in the first accumulator 140 after storing the first accumulated block 128, such as in a ping-pong implementation as described with reference to FIG. 4.

The method 600 may be implemented by a field-programmable gate array (FPGA) device, an application-specific integrated circuit (ASIC), a processing unit such as a central processing unit (CPU), a digital signal processor (DSP), a controller, another hardware device, firmware device, or any combination thereof. As an example, the method 600 may be performed by a processor that executes instructions, such as described herein.

Figure 7:
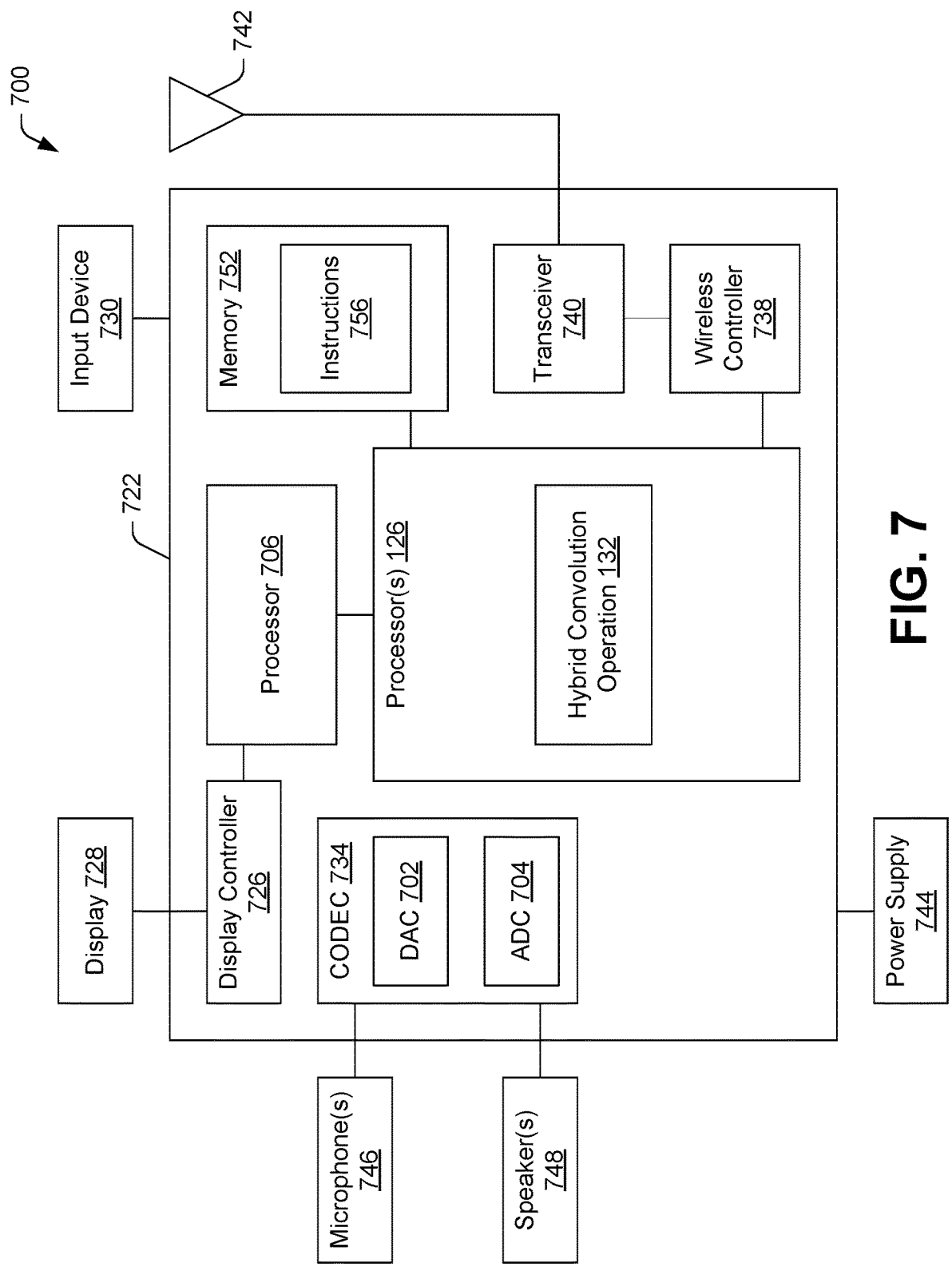
FIG. 7 is a block diagram of a particular illustrative example of a device that is operable to perform hybrid convolution operations, in accordance with some examples of the present disclosure.

FIG. 7 depicts a block diagram of a particular illustrative implementation of a device 700 that includes the one or more processors 126, such as in a wireless communication device implementation (e.g., a smartphone) or a digital assistant device implementation. In various implementations, the device 700 may have more or fewer components than illustrated in FIG. 7. In an illustrative implementation, the device 700 may correspond to the device 102. In an illustrative implementation, the device 700 may perform one or more operations described with reference to FIGS. 1-6.

In a particular implementation, the device 700 includes a processor 706 (e.g., a central processing unit (CPU)) that is coupled to the one or more processors 126 (e.g., one or more DSPs, GPUs, other processors, or any combination thereof). In some implementations, one or more processors of the device 700 include a speech and music coder-decoder (CODEC) that may include a voice coder ("vocoder") encoder, a vocoder decoder, or both.

The device 700 may include a memory 752 and a CODEC 734. The memory 752 may correspond to the memory 108 and may include instructions 756 that are executable by the one or more processors 126 to implement the functionality described with reference to the first hybrid convolution operation 132. For example, the memory 752 may include a computer-readable storage device storing the instructions 756 that, when executed by the one or more processors 126, cause the one or more processors 126 to: retrieve a first block of data and at least a portion of a second block of values from a memory, the data corresponding to an array of values arranged along at least a first dimension and a second dimension; perform a first hybrid convolution operation that applies a filter across the first block and at least the portion of the second block to generate output data, where the output data includes a first accumulated block and at least a portion of a second accumulated block; and store the first accumulated block as first output data, where the portion of the second block is adjacent to the first block along the first dimension and the portion of the second accumulated block is adjacent to the first accumulated block along the second dimension.

The device 700 may include a wireless controller 738 coupled, via a transceiver 740, to one or more antennas 742. In some implementations, the one or more antennas 742 include one or more antennas configured to receive data indicative of the filter 130, the input data 110, or a combination thereof.

The device 700 may include a display 728 coupled to a display controller 726. The CODEC 734 may be coupled to one or more microphones 746 and one or more speakers 714 and may include a digital-to-analog converter (DAC) 702 and an analog-to-digital converter (ADC) 704. In a particular implementation, the CODEC 734 may receive analog signals from one or more microphones 746 (e.g., the microphone 106), convert the analog signals to digital signals using the analog-to-digital converter 704, and provide the digital signals for storage as the input data 110, such as for speech processing (e.g., convolutional neural-network based speech recognition, speaker recognition, one or more other types of speech processing, or any combination thereof).

In a particular implementation, the device 700 includes one or more input devices 730. For example, the input device(s) 730 can include one or more cameras, such as the camera 104, configured to capture video input for storage as the input data 110.

In a particular implementation, the device 700 may be included in a system-in-package or system-on-chip device 722. In a particular implementation, the memory 752, the processor 706, the processor(s) 126, the display controller 726, the CODEC 734, the wireless controller 738, and the transceiver 740 are included in a system-in-package or system-on-chip device 722. In a particular implementation, the input device 730 and a power supply 744 are coupled to the system-in-package or system-on-chip device 722. Moreover, in a particular implementation, as illustrated in FIG. 7, the display 728, the input device 730, the microphone(s) 746, the speaker(s) 748, the antenna 742, and the power supply 744 are external to the system-in-package or system-on-chip device 722. In a particular implementation, each of the display 728, the input device 730, the microphone(s) 746, the speaker(s) 748, the antenna 742, and the power supply 744 may be coupled to a component of the system-in-package or system-on-chip device 722, such as an interface or a controller.

The device 700 may include a voice-activated device, an audio device, a wireless speaker and voice activated device, a portable electronic device, a car, a vehicle, a computing device, a communication device, an internet-of-things (IoT) device, a virtual reality (VR) device, a smart speaker, a mobile communication device, a smart phone, a cellular phone, a laptop computer, a computer, a tablet, a personal digital assistant, a display device, a television, a gaming console, a music player, a radio, a digital video player, a digital video disc (DVD) player, a tuner, a camera, a navigation device, a home automation system, a wireless speaker and voice activated device, a base station, or any combination thereof. In a particular aspect, the processor 716, the processor(s) 126, or a combination thereof, are included in an integrated circuit.

In conjunction with the described implementations, an apparatus for performing convolution includes means for retrieving a first block of data and at least a portion of a second block of data, the data corresponding to an array of values arranged along at least a first dimension and a second dimension. For example, the means for retrieving the first block can include the one or more processors 126, the device 502, the circuitry 516, the processor 706, the instructions 756 executable by the processor(s) 706, 126, one or more other device, modules, circuits, components, or a combination thereof.

The apparatus includes means for performing a hybrid convolution operation that applies a filter across the first block and at least the portion of the second block to generate output data, where the output data includes a first accumulated block and at least a portion of a second accumulated block. For example, the means for performing the hybrid convolution operation can include the one or more processors 126, the device 502, the circuitry 516, the processor 706, the instructions 756 executable by the processor(s) 706, 126, one or more other device, modules, circuits, components, or a combination thereof.

The apparatus also includes means for storing the first accumulated block as first output data, wherein the portion of the second block is adjacent to the first block along the first dimension and the portion of the second accumulated block is adjacent to the first accumulated block along the second dimension. For example, the means for storing can include the one or more processors 126, the device 502, the circuitry 516, the processor 706, the instructions 756 executable by the processor(s) 706, 126, one or more other device, modules, circuits, components, or a combination thereof.

In some implementations, a non-transitory, computer readable medium stores instructions that, when executed by one or more processors, cause the one or more processors to initiate, perform, or control operations to perform part or all of the functionality described above. For example, the instructions may be executable to implement one or more of the operations or methods of FIGS. 1-7. In some implementations, part or all of one or more of the operations or methods of FIGS. 1-7 may be implemented by one or more processors (e.g., one or more central processing units (CPUs), one or more graphics processing units (GPUs), one or more digital signal processors (DSPs)) executing instructions, by dedicated hardware circuitry, or any combination thereof.

The illustrations of the examples described herein are intended to provide a general understanding of the structure of the various implementations. The illustrations are not intended to serve as a complete description of all of the elements and features of apparatus and systems that utilize the structures or methods described herein. Many other implementations may be apparent to those of skill in the art upon reviewing the disclosure. Other implementations may be utilized and derived from the disclosure, such that structural and logical substitutions and changes may be made without departing from the scope of the disclosure. For example, method operations may be performed in a different order than shown in the figures or one or more method operations may be omitted. Accordingly, the disclosure and the figures are to be regarded as illustrative rather than restrictive.

Those of skill would further appreciate that the various illustrative logical blocks, configurations, modules, circuits, and algorithm steps described in connection with the implementations disclosed herein may be implemented as electronic hardware, computer software executed by a processor, or combinations of both. Various illustrative components, blocks, configurations, modules, circuits, and steps have been described above generally in terms of their functionality. Whether such functionality is implemented as hardware or processor executable instructions depends upon the particular application and design constraints imposed on the overall system. Skilled artisans may implement the described functionality in varying ways for each particular application, and such implementation decisions are not to be interpreted as causing a departure from the scope of the present disclosure.

The steps of a method or algorithm described in connection with the implementations disclosed herein may be embodied directly in hardware, in a software module executed by a processor, or in a combination of the two. A software module may reside in random access memory (RAM), flash memory, read-only memory (ROM), programmable read-only memory (PROM), erasable programmable read-only memory (EPROM), electrically erasable programmable read-only memory (EEPROM), registers, hard disk, a removable disk, a compact disc read-only memory (CD-ROM), or any other form of non-transient storage medium known in the art. An exemplary storage medium is coupled to the processor such that the processor may read information from, and write information to, the storage medium. In the alternative, the storage medium may be integral to the processor. The processor and the storage medium may reside in an application-specific integrated circuit (ASIC). The ASIC may reside in a computing device or a user terminal. In the alternative, the processor and the storage medium may reside as discrete components in a computing device or user terminal.

The previous description of the disclosed implementations is provided to enable a person skilled in the art to make or use the disclosed implementations. Various modifications to these implementations will be readily apparent to those skilled in the art, and the principles defined herein may be applied to other implementations without departing from the scope of the disclosure. The Abstract of the Disclosure is submitted with the understanding that it will not be used to interpret or limit the scope or meaning of the claims. In addition, in the foregoing Detailed Description, various features may be grouped together or described in a single implementation for the purpose of streamlining the disclosure. Examples described above illustrate but do not limit the disclosure. It should also be understood that numerous modifications and variations are possible in accordance with the principles of the present disclosure. Thus, the present disclosure is not intended to be limited to the implementations shown herein and is to be accorded the widest scope possible consistent with the principles and novel features as defined by the following claims.

What is claimed is:

1. A device comprising:
   a memory configured to store:
      data corresponding to an array of input values arranged along at least a first dimension and a second dimension, and
      output data corresponding to an array of output values arranged along at least the first dimension and the second dimension; and
   one or more processors configured to:
      retrieve a first block of the data and at least a portion of a second block of the data from the memory;
      perform a first hybrid convolution operation configured to apply a filter across the first block and at least the portion of the second block to generate a first accumulated block and at least a portion of a second accumulated block; and
      store the first accumulated block as first output data, wherein:
         the portion of the second block is adjacent to the first block along the first dimension of the array of input values, and
         the portion of the second accumulated block is adjacent to the first accumulated block along the second dimension of the array of output values.

2. The device of claim 1, wherein each of the first block, the second block, the first accumulated block, and the second accumulated block is sized in accordance with a memory access data size that is supported by the memory for memory accesses by the one or more processors.

3. The device of claim 2, wherein the first hybrid convolution operation is configured to use zero padding along the second dimension without use of zero padding along the first dimension to enable convolution with at most two memory accesses to retrieve the first block and the portion of the second block and with at most two memory accesses to store the first accumulated block and the portion of the second accumulated block.

4. The device of claim 1, wherein:
   the first block and the portion of the second block together correspond to N rows and a first M columns of the array of input values, N and M are positive integers, and N is greater than M;
   the first accumulated block and the second accumulated block together correspond to M rows and N columns of output data;
   the first accumulated block corresponds to M rows and M columns of accumulated values in a first accumulator; and
   the portion of the second accumulated block corresponds to M rows and N-M columns of partial accumulated values in a second accumulator.

5. The device of claim 4, wherein the one or more processors are further configured to access the first block using a first memory access operation and to access the portion of the second block using a second memory access operation, and wherein each of the first memory access operation and the second memory access operation is configured to retrieve, at most, M rows and M columns of the data.

6. The device of claim 4, wherein the filter includes P rows and P columns of filter values, and wherein P=N−M+1.

7. The device of claim 4, wherein the one or more processors are further configured to:
   retrieve a third block and at least a portion of a fourth block of the data that together correspond to the N rows and a second M columns of the array of input values;
   perform a second hybrid convolution operation on the third block and the portion of the fourth block to update the second accumulated block and to generate at least a portion of a third accumulated block that is adjacent to the second accumulated block along the second dimension of the array of output values; and
   store the second accumulated block as second output data.

8. The device of claim 7, wherein the one or more processors are further configured to perform a sequence of hybrid convolution operations including the first hybrid convolution operation and the second hybrid convolution operation in a pipelined manner in which storage of the first accumulated block and performance of the second hybrid convolution operation occur during a same pipeline cycle.

9. The device of claim 7, wherein the one or more processors are further configured to:
   generate the first accumulated block in the first accumulator;
   generate the second accumulated block in the second accumulator; and
   generate the third accumulated block in the first accumulator after storing the first accumulated block.

10. The device of claim 1, wherein the one or more processors are configured to convolve the data with the filter in accordance with an image processing operation.

11. The device of claim 1, wherein the one or more processors are configured to convolve the data with the filter in accordance with a neural network convolutional layer operation.

12. The device of claim 11, wherein the memory and the one or more processors are integrated into a vehicle.

13. The device of claim 11, wherein the memory and the one or more processors are integrated into a home automation system.

14. The device of claim 1, wherein the memory and the one or more processors are integrated into a mobile device.

15. The device of claim 1, wherein the one or more processors are included in an integrated circuit.

16. A method of performing convolution, the method comprising:
retrieving, at one or more processors, a first block of data and at least a portion of a second block of data from a memory, the data corresponding to an array of input values arranged along at least a first dimension and a second dimension;
performing a first hybrid convolution operation that applies a filter across the first block and at least the portion of the second block to generate a first accumulated block and at least a portion of a second accumulated block; and
storing the first accumulated block as first output data, wherein:
the portion of the second block is adjacent to the first block along the first dimension of the array of input values, and
the portion of the second accumulated block is adjacent to the first accumulated block along the second dimension of an array of output values arranged along at least the first dimension and the second dimension.

17. The method of claim 16, wherein:
each of the first block, the second block, the first accumulated block, and the second accumulated block is sized in accordance with a memory access data size that is supported by the memory for memory accesses by the one or more processors; and
the memory is:
distinct from the one or more processors; or
a dynamic random access memory (DRAM).

18. The method of claim 16, wherein:
the first hybrid convolution operation uses zero padding along the second dimension without using zero padding along the first dimension to enable convolution using at most two memory accesses to retrieve the first block and the portion of the second block and using at most two memory accesses to store the first accumulated block and the portion of the second accumulated block;
the array of input values being partitioned into blocks logically arranged along at least the first dimension and the second dimension, the blocks including the first block and the second block that is adjacent to the first block along the first dimension; and
the array of outputs values being partitioned into accumulated blocks logically arranged along at least the first dimension and the second dimension, the accumulated blocks including the first accumulated block and the second accumulated block that is adjacent to the first accumulated block along the second dimension.

19. The method of claim 16, wherein retrieving the first block includes using a first memory access operation, wherein retrieving the portion of the second block includes using a second memory access operation, wherein each of the first memory access operation and the second memory access operation is configured to retrieve, at most, M rows and M columns of the data, wherein M is a positive integer, and wherein each of the first accumulated block and the second accumulated block corresponds to M rows and M columns of output data.

20. The method of claim 19, further comprising:
retrieving a third block of the data that is adjacent to the first block along the first second dimension of the array of input values;
retrieving at least a portion of a fourth block of the data that is adjacent to the portion of the second block along the second dimension of the array of input values and adjacent to the third block along the first dimension of the array of input values;
performing a second hybrid convolution operation on the third block and the portion of the fourth block to update the second accumulated block and to generate at least a portion of a third accumulated block that is adjacent to the second accumulated block along the second dimension of the array of output values; and
storing the second accumulated block as second output data.

21. The method of claim 20, wherein the first hybrid convolution operation and the second hybrid convolution operation are part of a sequence of hybrid convolution operations that are performed in a pipelined manner in which storage of the first accumulated block and performance of the second hybrid convolution operation occur during a same pipeline cycle.

22. The method of claim 20, further comprising:
generating the first accumulated block in a first accumulator;
generating the second accumulated block in a second accumulator; and
generating the third accumulated block in the first accumulator after storing the first accumulated block.

23. The method of claim 16, wherein the one or more processors are configured to convolve the data with the filter in accordance with at least one of an image processing operation or a neural network convolutional layer operation.

24. A computer-readable storage device storing instructions that, when executed by one or more processors, cause the one or more processors to:
retrieve a first block of data and at least a portion of a second block of data from a memory, the data corresponding to an array of input values arranged along at least a first dimension and a second dimension;
perform a first hybrid convolution operation that applies a filter across the first block and at least the portion of the second block to generate a first accumulated block and at least a portion of a second accumulated block; and
store the first accumulated block as first output data, wherein:
the portion of the second block is adjacent to the first block along the first dimension of the array of input values, and
the portion of the second accumulated block is adjacent to the first accumulated block along the second dimension of an array of output values arranged along at least the first dimension and the second dimension.

25. The computer-readable storage device of claim 24, wherein each of the first block, the second block, the first accumulated block, and the second accumulated block is sized in accordance with a memory access data size that is supported by the memory for memory accesses by the one or more processors.

26. The computer-readable storage device of claim 24, wherein each of the first block, the second block, the first accumulated block, and the second accumulated block have the same size.

27. The computer-readable storage device of claim 24, wherein the instructions, when executed by the one or more processors, further cause the one or more processors to:
- retrieve a third block of the data that is adjacent to the first block along the first second dimension of the array of input values;
- retrieve at least a portion of a fourth block of the data that is adjacent to the portion of the second block along the second dimension of the array of input values, and adjacent to the third block along the first dimension of the array of input values;
- perform a second hybrid convolution operation on the third block and the portion of the fourth block to update the second accumulated block and to generate at least a portion of a third accumulated block that is adjacent to the second accumulated block along the second dimension of the array of output value; and
- store the second accumulated block as second output data.

28. An apparatus comprising:
- means for retrieving a first block of data and at least a portion of a second block of data, the data corresponding to an array of input values arranged along at least a first dimension and a second dimension;
- means for performing a hybrid convolution operation that applies a filter across the first block and at least the portion of the second block to generate a first accumulated block and at least a portion of a second accumulated block; and
- means for storing the first accumulated block as first output data, wherein:
  - the portion of the second block is adjacent to the first block along the first dimension of the array of input values, and
  - the portion of the second accumulated block is adjacent to the first accumulated block along the second dimension of an array of output values arranged along at least the first dimension and the second dimension.

29. The apparatus of claim 28, wherein the means for retrieving, the means for performing the hybrid convolution operation, and the means for storing are integrated into at least one of a home automation system, a voice-activated device, a wireless speaker and voice activated device, a portable electronic device, a car, a vehicle, a computing device, a communication device, an internet-of-things (IoT) device, a virtual reality (VR) device, a base station, a mobile device, or a combination thereof.

30. The apparatus of claim 28, wherein the means for performing the hybrid convolution operation is configured to convolve the data with the filter in accordance with at least one of an image processing operation or a neural network convolutional layer operation.

* * * * *